(12) United States Patent
Yuan et al.

(10) Patent No.: US 10,687,109 B2
(45) Date of Patent: *Jun. 16, 2020

(54) VIDEO INTEGRATION WITH HOME ASSISTANT

(71) Applicant: Google LLC, Mountain View, CA (US)

(72) Inventors: Jessica Yuan, Union City, CA (US); James Stewart, San Mateo, CA (US); Rajeev Nongpiur, Mountain View, CA (US); Patrick Lister, Mountain View, CA (US); Chi Yeung Jonathan Ng, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/230,349

(22) Filed: Dec. 21, 2018

(65) Prior Publication Data
US 2019/0124393 A1    Apr. 25, 2019

Related U.S. Application Data

(63) Continuation of application No. 15/654,491, filed on Jul. 19, 2017, now Pat. No. 10,200,746.

(51) Int. Cl.
   *G10L 17/22*        (2013.01)
   *H04N 21/436*      (2011.01)
   *H04N 21/234*      (2011.01)
   *H04N 21/4223*     (2011.01)
   *G06Q 10/10*        (2012.01)
   (Continued)

(52) U.S. Cl.
CPC ..... *H04N 21/43615* (2013.01); *G06Q 10/109* (2013.01); *G10L 17/22* (2013.01); *H04L 12/281* (2013.01); *H04L 12/282* (2013.01); *H04L 12/2803* (2013.01); *H04L 67/325* (2013.01); *H04N 21/23418* (2013.01); *H04N 21/25875* (2013.01); *H04N 21/4223* (2013.01)

(58) Field of Classification Search
CPC ........................................................ G10L 17/22
USPC ........................................................ 704/275
See application file for complete search history.

(56) References Cited

U.S. PATENT DOCUMENTS 6,463,463 B1    10/2002    Godfrey et al.
9,245,254 B2    1/2016    Lord et al.
(Continued)

OTHER PUBLICATIONS

Extended European Search Report dated Jul. 15, 2019 in European Patent Application No. 18740078.3, all pages.
(Continued)

*Primary Examiner* — Susan I McFadden
(74) *Attorney, Agent, or Firm* — Kilpatrick Townsend & Stockton LLP

(57) ABSTRACT

Various arrangements are detailed herein related to modifying a shopping list using a home assistant device and an integrated video service. A network-enabled video camera may be used to capture a video stream of a location at which a user is present. A home assistant device may receive a spoken command that requests an item be added to a shopping list. The video stream captured using the network-enabled video camera may be analyzed to determine an identity of the user. A shopping list to modify may be determined based on the identity of the user. The determined shopping list may then be modified to indicate the item requested in the spoken command.

19 Claims, 8 Drawing Sheets

(51) Int. Cl.
  *H04N 21/258* (2011.01)
  *H04L 12/28* (2006.01)
  *H04L 29/08* (2006.01)

(56) References Cited

U.S. PATENT DOCUMENTS

| | | |
|---|---|---|
| 9,462,112 B2 | 10/2016 | Woolsey et al. |
| 9,491,033 B1 | 11/2016 | Soyannwo et al. |
| 9,516,022 B2 | 12/2016 | Borzycki et al. |
| 10,009,666 B1 | 6/2018 | van Scheltinga et al. |
| 10,049,668 B2 | 8/2018 | Huang et al. |
| 10,200,746 B1 * | 2/2019 | Yuan .................. G10L 17/22 |
| 2005/0055648 A1 | 3/2005 | Dong |
| 2008/0167938 A1 | 7/2008 | Meisels et al. |
| 2010/0045796 A1 | 2/2010 | Fraley et al. |
| 2014/0081633 A1 | 3/2014 | Badaskar |
| 2014/0181741 A1 | 6/2014 | Apacible et al. |
| 2017/0078281 A1 | 3/2017 | Lu et al. |

OTHER PUBLICATIONS

International Search Report and Written Opinion dated Jun. 20, 2018 for International Patent Application No. PCT/US2018/025682 filed Apr. 2, 2018, all pages.

Constant Gbaguidi et al: "Integration of Internet and Telecommunications: An Architecture for Hybrid Services", IEEE Journal On Selected Areas In Communications, IEEE Service Center, Piscataway, US, vol. 17, No. 9, Sep. 1, 1999 (Sep. 1, 1999), XP011055011, ISSN: 0733-8716 *Section V; p. 1574-1577.

Communication pursuant to Rule 164(1) EPC, partial supplementary European Search Report dated Apr. 11, 2019 in European Patent Application No. 18740078.3, all pages.

* cited by examiner

VIDEO INTEGRATION WITH HOME ASSISTANT

CROSS REFERENCE TO RELATED APPLICATIONS

This application is a continuation of U.S. Non-Provisional patent application Ser. No. 15/654,491, filed Jul. 19, 2017, entitled "Video Integration with Home Assistant." The above-identified patent applications are hereby incorporated by reference herein in their entireties for all purposes.

BACKGROUND

Home assistant (HA) devices can provide users with valuable information. Typically, a user speaks a trigger word or phrase in order to activate an HA device. For instance, a user may say "OK computer" or "Hey device" to trigger the HA device to transition to a command or query listening mode. The HA device may then listen to a query or command stated by the user and the HA may take some action in response to the query or command. This may include accessing a remote service to attempt to determine an answer to the user's query. As an example, a user may ask the HA device about the weather and the HA device may access an Internet-based weather service to obtain local weather information. While an HA device can provide a user with significant functionality, many common arrangements may be inherently limited since such devices can only listen to the user and the user's environment.

SUMMARY

Various arrangements, including methods, systems, devices, and non-transitory processor readable mediums are detailed herein related to managing scheduled events using a home assistant and an integrated video service. Using a network-enabled video camera, a video stream of a location at which a user is present may be captured. The video stream captured using the network-enabled video camera may be used to determine an identity of the user. In response to identifying the identity of the user, access to a cloud-based calendar account for the user may be determined to be authorized. The cloud-based calendar account linked with the user may be accessed. A next calendar event mapped to the cloud-based calendar account that is scheduled to occur within a threshold time duration may be determined. In response to determining that the next calendar event mapped to the cloud-based calendar account is scheduled to occur within the threshold time duration, a description linked with the next calendar event may be accessed. A network-enabled smart home assistant device may synthesize speech to announce a scheduled start time and read a description linked with the next calendar event while the user remains present within the video stream.

Various embodiments of such methods, systems, devices, and non-transitory processor readable mediums may include one or more of the following features: An event location that is linked with the next calendar event may be determined. A traffic service may be accessed to determine a travel time from a home location linked with the network-enabled smart home assistant device or the network-enabled video camera to the event location. Speech may be synthesized using the network-enabled smart home assistant device to indicate a time at which the user should leave the home location to reach the event location based on the determined travel time. A spoken command may be received that requests a video clip be recorded. The video clip may be recorded from the video stream, wherein the video clip is mapped to a user account of the user. A spoken command may be received that requests the video clip be recorded at a time in the future. A recording event may be scheduled based on the spoken command and the time. The video clip may be recorded from the video stream starting at the time, wherein the video clip is mapped to a user account of the user. A spoken command may be received that requests an image be captured. Synthesizing speech may be output using the network-enabled smart home assistant device to indicate an amount of time until the image is captured. The image may be captured using the network-enabled video camera. The image may be stored and mapped to a user account of the user. A spoken command may be received that requests a time-lapse video clip be recorded, the spoken command specifying a start time and an end time. A plurality of images may be captured between the start time and the end time, wherein a frequency of images captured is dependent on a duration of time between the start time and the end time. The time-lapse video clip may be created using the plurality of images. A spoken command may be received that requests a history of one or more events at the location. A stored video stream may be analyzed for at least a predefined time period. A plurality of events may be identified that are linked with an audio level above a defined threshold. A video highlight reel may be created that includes video from the stored video stream recorded during the plurality of events.

Additionally or alternatively, embodiments of such methods, systems, devices, and non-transitory processor readable mediums may include one or more of the following features: A first spoken query may be received from an identified user. The user may be determined to be authorized to access the cloud-based calendar account linked with the network-enabled smart home assistant device. A synthesized speech response may be output in response to the first spoken query that incorporates information from the cloud-based calendar account linked with the network-enabled smart home assistant device. The video stream captured using the network-enabled video camera may be analyzed to determine an unidentified user is present. A second spoken query from the unidentified user may be received. The unidentified user may be determined to not be authorized to access any calendar linked with the network-enabled smart home assistant device. A generic response may be output in response to the second spoken query that does not incorporate information from any calendar linked with the network-enabled smart home assistant device. A spoken query may be received from an identified user. It may be determined that the spoken query is requesting an item be added to a stored shopping list. In response to determining the spoken query, a name of the item may be determined by performing object recognition on one or more frames of the video stream. The determined name of the item may be added to the stored shopping list.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the descrip

DETAILED DESCRIPTION

Integration of a home assistant (HA) service with a video streaming service can increase the functionality of both services. That is, by an HA service being performed in conjunction with a video feed of a region including or near where a user of the HA service is located, the functionality provided to the user may be substantially increased. Such integration may be performed directly between devices or in the cloud. An HA service (which may be executed by a dedicated HA device or another device that has the appropriate hardware) may transmit audio captured from a user and transmit to a cloud-based HA platform for processing. Similarly, a video streaming service may transmit video captured from a location near the device providing the HA service. A cloud-based HA integration platform may analyze audio received from the HA service and video received from the video streaming service. A response provided to the user via the HA service, an action performed by the HA service, or how streaming video is handled may be determined by the cloud-based HA integration platform based on the audio from the HA service and the video from the streaming video service.

Figure 1:
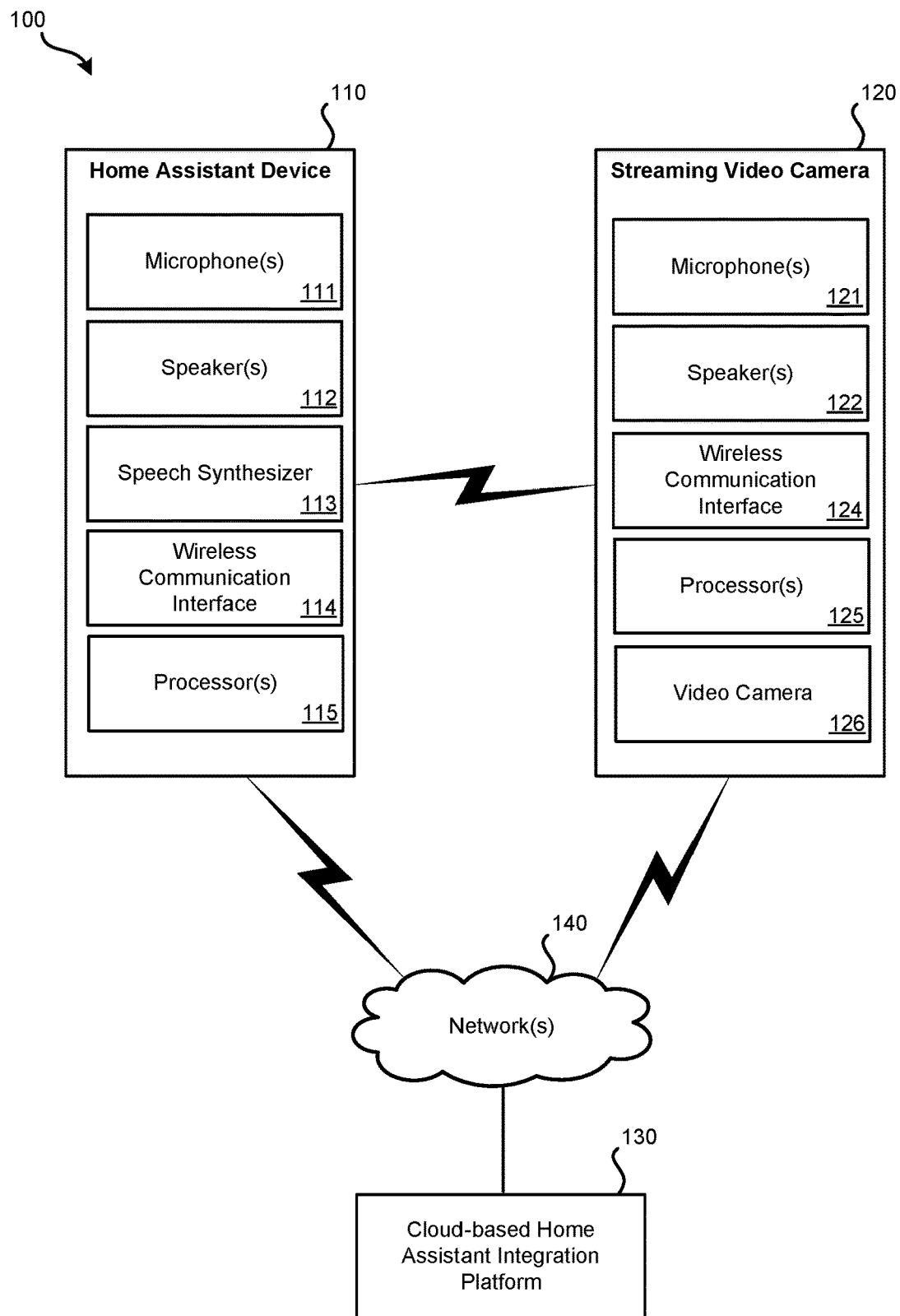
- FIG. 1 illustrates an embodiment of a home assistant device integrated with a streaming video camera using a cloud-based service.

FIG. 1 illustrates an embodiment of a video integration with HA system 100 having a HA device 110 integrated with a streaming video camera 120 using a cloud-based HA integration platform 130 (referred to as the "platform"). An HA device 110 may be a stand-alone device that may be installed in or near a user's residence such that HA device 110 can communicate with a local wireless network and the Internet. HA device 110 may provide HA services, which include the ability to receive a spoken query and respond to the spoken query using natural, spoken language. HA device 110 may include: one or more microphones 111, one or more speakers 112, speech synthesizer 113, wireless communication interface 114, and one or more processors 115.

Microphones 111 may be used to capture audio from the ambient environment of HA device 110. This captured audio may be analyzed to determine if a user is attempting to input a command or query (collectively referred to as "queries"). If multiple microphones 111 are present, beamforming may be performed to listen to audio from an area (to the exclusion of another area) near where HA device 110 is located. Speakers 112 may be used for outputting audio into the environment of HA device 110. Such audio may include synthesized speech and may be in response to a query received via microphones 111. That is, the primary form of input received by HA device 110 may be received audio and the primary form of output of HA device 110 may be output audio.

Speech synthesizer 113 may allow HA device 110 to generate speech and thus provide auditory information to a user in the form of natural, spoken language. Based upon data received from one or more external or internal sources, speech synthesizer 113 may use speakers 112 to output synthesized spoken speech, typically in a language set by a user, into the ambient environment of HA device 110. Speech synthesizer 113 may be executed as a process by one or more processors of processors 115 or, in some embodiments, may be remotely performed by cloud-based HA integration platform 130 and HA device 110 may serve as the playback point for such audio.

Wireless communication interface 114 may allow HA device 110 to communicate with one or more different wireless networks and/or devices. Wireless communication interface 114 may allow for communication with a wireless local area network (WLAN) that operates using an IEEE 802.11 protocol and/or may allow for direct device-to-device communication using a different protocol, such as WiFi DIRECT or BLUETOOTH. For instance, data may be directly exchanged between streaming video camera 120 and HA device 110, exchanged via one or more networks 140, or exchanged via cloud-based HA integration platform 130. One or more processors 115 may be on-board HA device 110 and may perform processing functions for HA device 110, including functionality of speech synthesizer 113. It should be understood that HA device 110 may also include various components typically found in a computerized device, including memory, a user interface (e.g., one or more buttons), one or more lights, a data bus, a power supply, a housing, etc.

While video integration with HA system 100 illustrates HA device 110 as a distinct, stand-alone device that provides users with HA services, it should be understood that such HA services may be provided by a non-dedicated device that has sufficient hardware resources to perform such functionality. For example, streaming video camera 120, which may have on-board one or more microphones, one or more speakers, a speech synthesizer, a wireless communication interface, and one or more processors, may provide HA services to users in its vicinity. Therefore, the functionality of HA device 110 may be provided by another device, such as a "smart" or home automation device.

Streaming video camera 120 may include: one or more microphones 121, one or more speakers 122, wireless communication interface 124, one or more processors 125, and video camera 126. Streaming video camera 120 may continuously, periodically, or intermittently capture video from a field-of-view at which video camera 126 is aimed. Streaming video camera 120 may continuously, periodically, or intermittently, upload or stream video via networks 140 to cloud-based HA integration platform 130.

Microphones 121 may be used to capture audio from the ambient environment of streaming video camera 120. This captured audio may be used to augment captured video with the associated audio. If multiple microphones 121 are present, beamforming may be performed to listen to audio from a direction (to at least the partial exclusion of another direction) near where streaming video camera 120 is located. Speakers 122 may be used for outputting audio into the environment of streaming video camera 120. Such audio may include speech provided by a user (such as via a remote device) and status sounds.

Wireless communication interface 124 can allow streaming video camera 120 to communicate with one or more different wireless networks and/or devices. Wireless communication interface 124 may allow for communication with a wireless local area network (WLAN) that operates using a IEEE 802.11 protocol and/or may allow for direct device-to-device communication using a different protocol, such as THREAD, ZIGBEE, Z-WAVE, WiFi DIRECT or BLUETOOTH. For instance, data may be directly exchanged between streaming video camera 120 and HA device 110, exchanged via one or more networks 140, or exchanged via cloud-based HA integration platform 130. One or more processors 125 may be on-board streaming video camera 120 and may perform processing functions for streaming video camera 120, such as movement detection.

Video camera 126 may continuously, periodically, or intermittently capture video of a field-of-view at which video camera 126 is aimed. This video, along with audio captured by microphones 121, may be streamed to cloud-based HA integration platform 130. Cloud-based HA integration platform 130 may store the streamed video for analysis and/or retrieval for playback (such as at the request of a user). It should be understood that streaming video camera 120 may also include various components typically found in a computerized device, including memory, a user interface (e.g., one or more buttons), one or more lights, a data bus, a power supply, a housing, etc.

One or more networks 140 may be used to facilitate communication between HA device 110, streaming video camera 120, and cloud-based HA integration platform 130. Such networks may include an in-structure WLAN, an internet service provider's network, and the Internet. Further detail regarding cloud-based HA integration platform 130 is provided in relation to FIG. 3.

Figure 2:
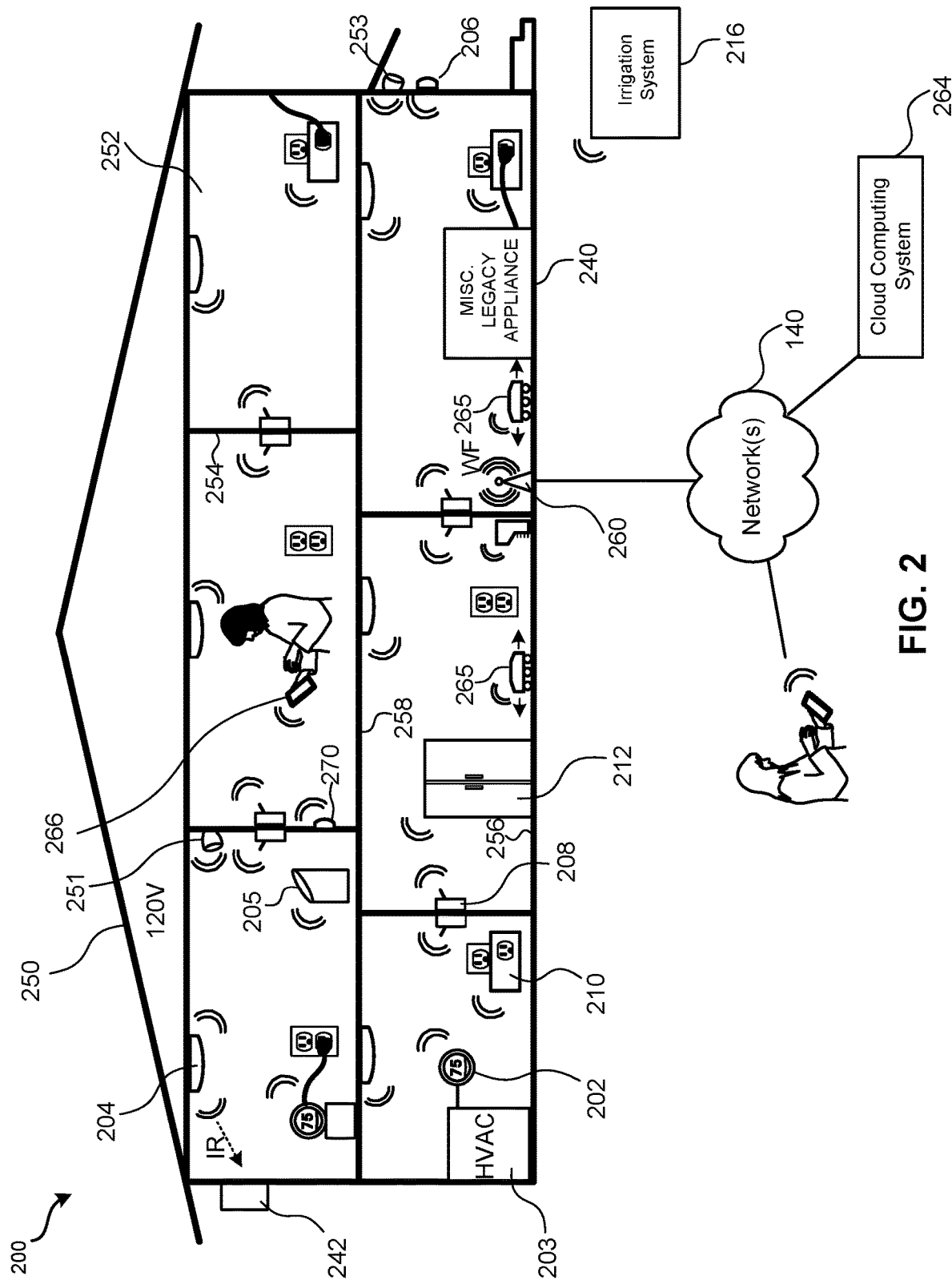
FIG. 2 illustrates an embodiment of a smart-home environment within which one or more of the devices, methods, systems, and/or services described herein are applicable.

While FIG. 1 focuses on the HA device and streaming video camera, these devices may function as part of a more complicated home automation environment. FIG. 2 illustrates an embodiment of a smart-home environment within which one or more of the devices, methods, systems, and/or services described herein are applicable. The depicted smart-home environment 200 includes a structure 250, which can include, e.g., a house, office building, garage, or mobile home. It will be appreciated that devices can also be integrated into a smart-home environment 200 that does not include a structure 250, such as an apartment, condominium, or office space. Further, the smart-home environment can control and/or be coupled to devices outside of the structure 250. Indeed, several devices in the smart-home environment need not physically be within the structure 250 at all. For example, a device controlling a pool heater or irrigation system 216 can be located outside of the structure.

The depicted structure 250 includes a plurality of rooms 252, separated at least partly from each other via walls 254. The walls 254 can include interior walls or exterior walls. Each room can further include a floor 256 and a ceiling 258. Devices can be mounted on, integrated with and/or supported by a wall 254, floor 256 or ceiling 258.

In some embodiments, the smart-home environment 200 of FIG. 2 includes a plurality of devices, including intelligent, multi-sensing, network-connected devices (sometimes referred to herein as "smart devices") that can integrate seamlessly with each other and/or with a central server or a cloud-computing system to provide any of a variety of useful smart-home objectives, including hazard-detection objectives, home security functionality, and HA functionality. The smart-home environment 200 may include one or more intelligent, multi-sensing, network-connected smart thermostats 202 (hereinafter referred to as "smart thermostats 202"), one or more intelligent, network-connected, multi-sensing smart hazard detection units (hereinafter referred to as "smart hazard detectors 204"), and one or more intelligent, multi-sensing, network-connected entryway interface smart doorbell devices 206 (hereinafter referred to as "smart doorbells 206"). Smart thermostats 202, smart hazard detectors 204, smart doorbells 206 are all examples of smart devices but are by no means exclusive. Streaming video camera 251, which can represent streaming video camera 120 of FIG. 1, may also be a smart device. Any of these smart devices (or some other form of smart device), if equipped with the appropriate hardware, may be able to perform HA services as detailed in relation to HA device 110 of FIG. 1. Additionally or alternatively, a dedicated HA device 205, which can represent HA device 110 of FIG. 1, may be present inside or outside structure 250.

According to embodiments, the smart thermostat 202 detects ambient climate characteristics (e.g., temperature and/or humidity) and controls a climate control system 203 accordingly, such as by turning on and/or off a fan and/or a heat source of the climate control system 203. (In the present disclosure, "climate control system" is used interchangeably with "HVAC system," to clarify that the disclosure applies equally to systems that do not necessarily include air conditioning. Use of the term "HVAC" herein does not exclude systems that lack air conditioning.)

When the fan of the climate control system 203 is on, the fan operates to circulate air between the rooms 252 of the structure 250, and to exhaust air from the structure 250 and draw fresh, outside air into the structure 250. The smart hazard detector 204 may detect the presence of a hazardous condition or a substance indicative of a hazardous condition (e.g., smoke, fire, heat, carbon monoxide, etc.). The smart doorbell 206 may detect a person's approach to or departure from a location (e.g., an outer door), control doorbell functionality, announce a person's approach or departure via audio or visual means, or control settings on a security system (e.g., to activate or deactivate the security system when occupants go and come). A streaming video camera, such as outdoor streaming video camera 253, may be part of or installed near smart doorbell 206 in order to provide video of activity in the vicinity of smart doorbell 206.

In some embodiments, the smart-home environment 200 of FIG. 2 further includes one or more intelligent, multi-sensing, network-connected wall switches 208 (hereinafter referred to as "smart wall switches 208," which can be a form of smart device), along with one or more intelligent, multi-sensing, network-connected wall plug interfaces 210 (hereinafter referred to as "smart wall plugs 210," which can be a form of smart device). The smart wall switches 208 may detect ambient lighting conditions, detect room-occupancy states, and control a power and/or dim state of one or more lights. In some instances, smart wall switches 208 may also control a power state or speed of a fan, such as a ceiling fan. The smart wall plugs 210 may detect occupancy of a room or enclosure and control supply of power to one or more wall plugs (e.g., such that power is not supplied to the plug if nobody is home).

Still further, in some embodiments, the smart-home environment 200 of FIG. 2 includes a plurality of intelligent, multi-sensing, network-connected smart appliances 212

(hereinafter referred to as "smart appliances 212," which can be a form of smart device), such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. According to embodiments, the network-connected smart appliances 212 are made compatible with the smart-home environment by cooperating with the respective manufacturers of the appliances. For example, the smart appliances can be space heaters, window AC units, motorized duct vents, etc. When plugged in, an appliance can announce itself to the smart-home network, such as by indicating what type of appliance it is, and it can automatically integrate with the controls of the smart-home, and, possibly, perform HA services. Such communication by the appliance to the smart home can be facilitated by any wired or wireless communication protocols known by those having ordinary skill in the art. The smart home also can include a variety of non-communicating legacy appliances 240, such as old conventional washer/dryers, refrigerators, and the like which can be controlled, albeit coarsely (ON/OFF), by virtue of the smart wall plugs 210. The smart-home environment 200 can further include a variety of partially communicating legacy appliances 242, such as infrared ("IR") controlled wall air conditioners or other IR-controlled devices, which can be controlled by IR signals provided by the smart hazard detectors 204 or the smart wall switches 208.

By virtue of network connectivity, one or more of the smart-home devices of FIG. 2 can further allow a user to interact with the device even if the user is not proximate to the device. For example, a user can communicate with a device using a computer 266 (e.g., a desktop computer, laptop computer, or tablet) or some other portable electronic device (e.g., a smartphone). A webpage or app can be configured to receive communications from the user and control the device based on the communications and/or to present information about the device's operation to the user. For example, the user can view a current setpoint temperature for a device and adjust it, using a computer 266. The user can be in the structure during this remote communication, or outside the structure.

As discussed, users can control the smart thermostat and other smart devices in the smart-home environment 200 using a computer 266, which as noted above may be a network-connected computer or portable electronic device such as a smartphone or tablet. In some examples, some or all of the occupants (e.g., individuals who live in the home) can register their computer 266 with the smart-home environment 200. Such registration can be made at a central server to authenticate the occupant and/or the device as being associated with the home and to give permission to the occupant to use the device to control the smart devices in the home. An occupant can use their computer 266 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to computers 266, the smart-home environment 200 makes inferences about which individuals live in the home and are therefore occupants and which computers 266 are associated with those individuals. As such, the smart-home environment "learns" who is an occupant and permits the computers 266 associated with those individuals to control the smart devices of the home.

According to embodiments, all or some of the smart devices can serve as wireless or wired repeaters. For example, a first one of the smart devices can communicate with a second one of the smart device via a wireless router 260. The smart devices can further communicate with each other via a connection to one or more networks 140, such as the Internet. Through the Internet, the smart devices can communicate with a central server or a cloud-computing system 264, which may host the cloud-based HA integration platform 130. The central server or cloud-computing system 264 can be associated with a manufacturer, support entity, or service provider associated with the device. Certain embodiments can transmit data such as streaming video, measurements of temperature, light, smoke, CO, sound, motion, control settings, alarm status, actions performed by the smart devices, and the like to cloud-computing system 264 for analysis. Further, software updates can be automatically sent from the central server or cloud-computing system 264 to devices (e.g., when available, when purchased, or at routine intervals).

Figure 3:
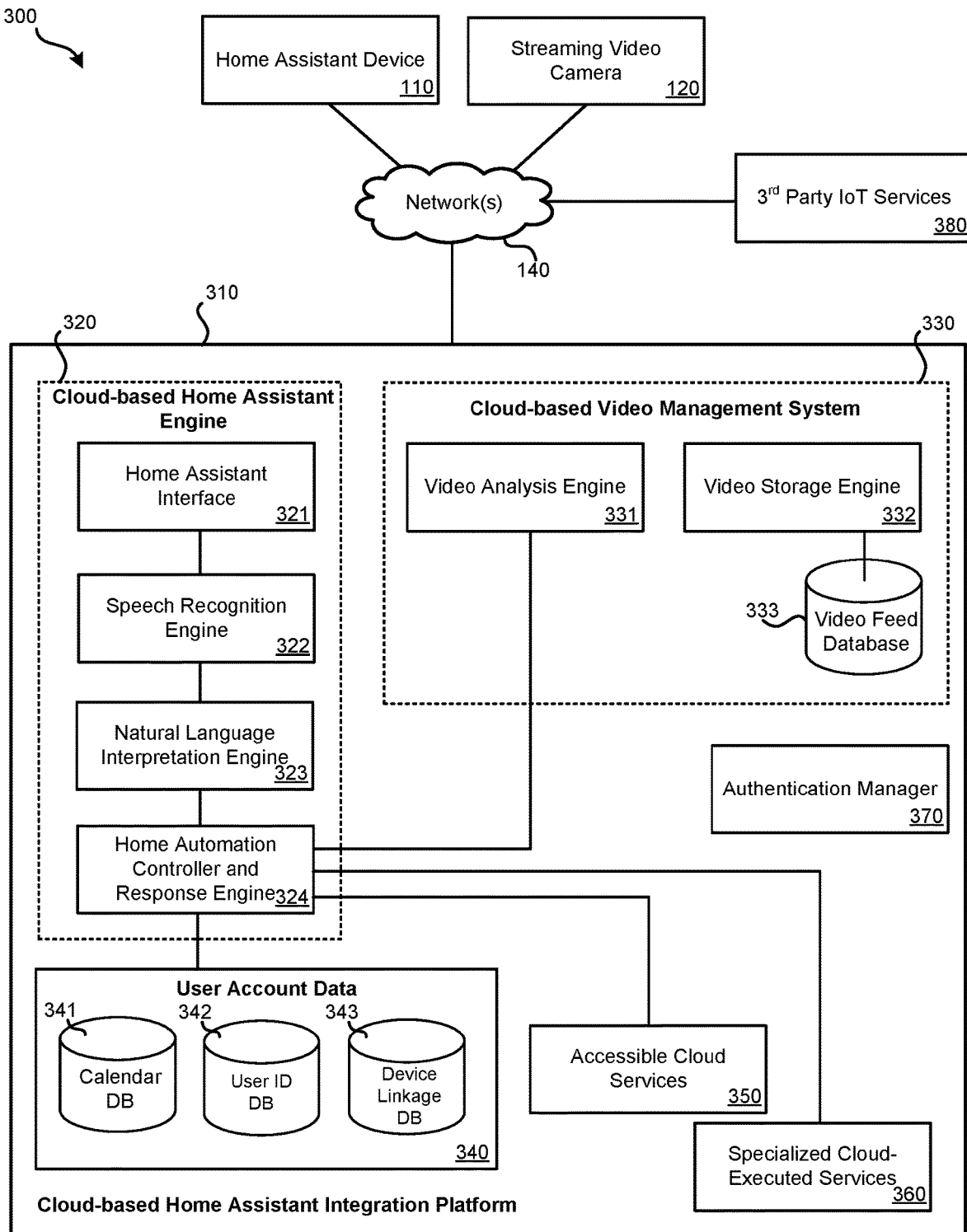
FIG. 3 illustrates an embodiment of a cloud-based home assistant integration system.

FIG. 3 illustrates an embodiment 300 of a cloud-based HA integration platform integrated with HA device 110, streaming video camera 120, and third party Internet of Things (IoT) services 380. As detailed in relation to FIG. 1, HA device 110 and streaming video camera 120 may communicate with cloud-based HA integration platform 310 via one or more networks 140. Cloud-based HA integration platform 310 can provide the framework for video streamed from streaming video camera 120 to be analyzed and used in conjunction with HA device 110. Therefore, functionality of HA device 110 may be affected by video captured by streaming video camera 120.

In embodiment 300, inquiries posed by a user to HA device 110 may be received by cloud-based HA engine 320. The clarity may be received by HA interface 321 in the form of an audio recording. HA interface 321 may receive the audio recording including the user query and perform some form of filtering on the received audio. Speech recognition engine 322 may analyze the filtered audio from HA interface 321 and determine a natural language equivalent of the user's spoken words. Natural language interpretation engine 323 may take the output of speech recognition engine 322 and determine a command or query posed by the user in the audio recording. Natural language interpretation engine 323 may be configured to determine precisely what the user is commanding or requesting. For instance, a user may be able to phrase the same request in multiple ways. For instance a user may say "Turn the temperature up by two degrees" or "Raise the temperature by a couple degrees." Natural language interpretation engine 323 may be able to analyze such commands and determine, such as in the above example, that a same request is being made. While in embodiment 300, HA interface 321, speech recognition engine 322, and natural language interpretation engine 323 are performed in the cloud by cloud-based HA integration platform 310, it should be understood that in other embodiments such functionality may be executed locally at HA device 110.

Home automation controller and response engine 324 may perform a function or provide a response based on the output of natural language interpretation engine 323. This response may be routed by home automation controller and response engine 324 back to HA device 110, which may then convert the response to synthesized spoken speech that is output into the ambient environment of HA device 110.

However, in some situations, the action or response determined by home automation controller in response engine 324 may be affected by an output of video analysis engine 331. Cloud-based video management system 330 may receive a stream of video from streaming video camera 120. Multiple actions may be performed with the streaming video. Video storage engine 332 may store all or a part of the received video feed in association with a user account linked with streaming video camera 120. This video feed may be stored to video feed database 333. From video feed database 333, a user who is authorized to access the associated user account may be able to access the stored video and review or playback the video as desired using a network connected computerized device, such as a computer, smart phone, or tablet computer. Additionally or alternatively, video analysis engine 331 may in real-time analyze video received from streaming video camera 120. Analyzing the received video in real time can refer to the video being analyzed within 1, 5, 10, or 30 seconds of the video being captured by streaming video camera 120. Ideally, the sooner the video is analyzed after being captured by streaming video camera 120, the better. Video analysis engine 331 may perform various video analysis functions, including facial recognition to determine whether one or more persons appearing in the field of view of streaming video camera 120 are authorized users according to user account data 340 or are unknown persons. Video analysis engine 331 may also determine where both authorized and unauthorized users are located in relation to HA device 110. Video analysis engine 331 may also be able to assess which person, if multiple persons are present, is speaking, such as by determining which person's lips are moving. Video analysis engine 331 may also be able to identify an object being held or pointed to by a user. Video analysis engine 331, in response to a command from home automation controller in response engine 324, may be able to control how video storage engine 332 functions. Video analysis engine 331 may have additional capabilities which are discussed in relation to FIGS. 4-8.

Home automation controller and response engine 324 may access user account data 340 for certain types of received commands or queries. Various types of information may be stored as part of user account data 340. Within user account data, calendar database 341 may store calendar entries for one or more users having accounts linked with HA device 110. Calendar database 341 may be part of or may be linked with a cloud-based calendar service, such as GOOGLE Calendars. Calendar database 341 may be populated with various entries specific to the user and may include a specific start time, end time, location, and event description. The user may have access to such calendar events via a web-based interface, application executed by a computerized device such as a smart phone, or some other interface platform. User identity database 342 may store information used to visually identify users linked with user account data 340. For instance, user identity database 342 may include maps of landmarks or features of authorized users. Data stored in user identity database 342 may be used in conjunction with video analysis engine 331 to identify authorized users. Device linkage database 343 may store information on other linked smart devices, such as those detailed in relation to FIG. 2, which can be controlled or queried via HA device 110. Such devices indicated in device linkage database 343 may be operated by the entity that hosts cloud-based HA integration platform 310 or by a separate entity that permits cloud-based HA integration platform 310 to interact with their devices. For instance, a smart home appliance may be linked with HA device 110 via device linkage database 343. In response to a command identified by home automation controller and response engine 324, the command may be routed via networks 140 to a third-party Internet of things (IoT) services 380 that communicates with the smart home appliance. Such an arrangement allows HA device 110 to be used in conjunction with smart devices of various other manufacturers and service providers.

Authentication manager 370 may manage device linkage database 343 and may determine which smart devices can be controlled by and communicate with HA device 110 via cloud-based HA engine 320. Authentication manager 370 may provide the appropriate authorizations for video analysis engine 331 to interact with home automation controller in response engine 324 if the user has, via the user account, registered HA device 110 with streaming video camera 120. This same process may be true for other smart devices. That is, for HA device 110 to be able to communicate with and/or use data from various smart devices, a user may be required to register the smart home device with authentication manager 370. Authentication manager 370 may manage authentication tokens for each of the registered home automation devices that enables home automation controller in response engine 324 to provide commands to, receive data from, and query such smart devices.

Accessible cloud services 350 represent other services provided on cloud-based HA integration platform 310 or a separate platform operated by the same service provider or another service provider that can be accessed by home automation controller and response engine 324. For instance, a weather service may be available via accessible cloud services 350. Home automation controller and response engine 324 may be able to query such a weather service for a particular date and a particular location and, in response, receive weather information that then can be relayed to HA device 110. As another example, a traffic service may be part of accessible cloud services 350 which may be used by home automation controller and response engine 324 to provide travel time information and directions to a user via HA device 110.

Specialized cloud-executed services 360 can represent services that are particular to HA devices that are provided via home automation controller and response engine 324. While services provided via accessible cloud services 350 can be accessed via multiple forms of interfaces (e.g., webpage), specialized cloud-executed services 360 are specifically designed for use with a HA device. For example, specialized cloud-executed services 360 may be used to provide various services, games, and/or activities to users of HA device 110 in conjunction with streaming video camera 120. Therefore, in order to access particular specialized cloud-executed services of specialized cloud-executed services 360, it may be required that the user has registered streaming video camera 120 with an account also linked with HA device 110 via authentication manager 370.

One possible specialized cloud-executed service included in specialized cloud-executed services 360 is an authorization management system that prevents unauthorized users from controlling particular home automation devices, home automation systems, and/or certain cloud-accessible data. For instance, home assistant device 110 may allow a user to control a home security system via cloud-based home assistant engine 320. A user may, for example, be able to disable the home security system by speaking a command to home assistant device 110 (e.g., "Turn off the security system."). The ability to issue such a command to home assistant device 110 may be problematic if the user is first not determined to be authorized. For instance, an intruder could disable the security system. As such, to perform certain functions available via cloud-based home assistant engine 320, authentication of the user and an authorization level may need to be determined. When a command is received from home assistant device 110 by cloud-based home assistant engine 320, if the command is mapped to an authorization level other than unprotected, authentication manager 370 may be used to identify a user speaking the command via video received from streaming video camera 120 and analyzed by cloud-based video management system 330. If the user is successfully authenticated and the user's account is linked with an authorization level that is at least as high as the authorization level of the command, the command may be executed; otherwise, the command may be blocked. In addition to control of a security system, control of various appliances, lights, doors, thermostats, or access to certain data may be restricted. For example, a specific example regarding access to calendar data is detailed in relation to method 400 of FIG. 4.

One possible specialized cloud-executed service included in specialized cloud-executed services 360 could include a game centered around drawing skills. In response to a request posed to HA device 110 to initiate the drawing game, home automation controller and response engine 324 may identify an object to be drawn. The home automation controller and response engine 324 may announce, via HA device 110, the object to be drawn, such as a "zebra" or "house." The user (or a nearby child) could then labor to draw his rendition of the stated object. After completion or within a defined time limit of the game, the child or another user may hold the drawing to be visible to streaming video camera 120. Video analysis engine 331 may, at the request of home automation controller and response engine 324, analyze the drawing held aloft by the user. Video analysis engine 331 may: (1) perform an image analysis on the drawing to determine whether it represents the object requested; and (2) perform an analysis using user account data 340 to determine who the user or person is that held the drawing aloft. In response, home automation controller and response engine 324 may respond using natural language via HA device 110, assess the drawing for user, and possibly identify the user in the response. For example, a response could be: "Good job, Johnny! That is a nice picture of a zebra! Do you want to keep playing?" As another example, if the drawing is determined by video analysis engine 331 to be lacking a particular attribute of the requested object, the response could be: "Nice try, Johnny. But don't forget to add the zebra's stripes! Try working on it some more!"

Another possible specialized cloud-executed service could be a game centered around movement towards the HA device 110 or streaming video camera 120. A user may request that the HA device 110 initiate a game of "Red Light, Green Light." This may trigger home automation controller and response engine 324 to access the associated service from specialized cloud-executed services 360. The HA device 110 may be used to announce the rules and tell each player participating to get in a line equidistant from either the HA device 110, streaming video camera 120, or some other device that serves as the "goal." The home automation controller and response engine 324 then causes the HA device 110 to periodically announce "red light" and "green light." When green light has been announced by HA device 110, players are free to move towards the goal. When red light has been announced by the HA device 110, players are required to remain stationary. If a player moves after "red light" has been announced, he or she is out of the game or is required to return to the starting point. Movement after the announcement of "red light" is enforced via image analysis via streaming video camera 120 and video analysis engine 331. If a player moves after a red light announcement, home automation controller and response engine 324 would cause HA device 110 to announce that a player is out and identify the player. If the player is identified based on user identity database 342, the user's name may be announced; if the player is unknown, characteristics of the player may be used, such as the player's shirt color. Video analysis engine 331 may also determine if a player has reached the goal. If so, home automation controller and response engine 324 can cause HA device 110 to announce the winner, either by name or characteristics.

Another possible specialized cloud-executed service of specialized cloud-executed services 360 could include a service to identify notable events having occurred at a location monitored by streaming video camera 120. For example, a user may speak a command to HA device 110 asking: "What happened here over the last two days"? In response, the service may create a highlight video reel that includes notable events identified by video analysis engine 331. Video analysis engine 331 may analyze stored video from video feed database 333 for movement between frames (above a threshold) and/or sound that exceeds a defined sound threshold. A highlight reel of video that has one or more frames that meet the movement and/or sound thresholds may be included in the video. This video may then be accessed by a user from cloud-based video management system via another device, such as a smartphone. Alternatively, home automation controller and response engine 324 can summarize the highlight reel, such as by saying the number of events detected, whether the events were due to a loud sound and/or movement, and when the events occurred. In some embodiments, rather than the highlight reel pertaining to the entire location, the user's command may ask about a particular item or the user may point to or hold up a particular item. Video analysis engine 331 may then create a highlight reel for that specific item based on movement and/or sound involving the item. A possible example is a user asking "What happened to this dish?" The HA device 110 may be instructed by home automation controller and response engine 324 to output a message stating that: "Jane Doe placed the dish there at 1:23 PM on Thursday, April 27$^{th}$."

Another possible specialized cloud-executed service is a yoga assistant. Upon receiving a request for a yoga class or pose instruction through HA device 110, home automation controller and response engine 324 may cause execution of a yoga service through specialized cloud-executed services 360. The yoga service may instruct, via home automation controller and response engine 324 and HA device 110, the user to perform a particular pose (possibly along with a description of the pose). Video of the user obtained from streaming video camera 120 may be analyzed by the service. Feedback, based on video analyzed by video analysis engine 331 and the service may be provided via home automation controller and response engine 324 and HA device 110 (such as "Try to keep your knee aligned above your foot" or "Relax your shoulders"). The user may then be walked through an entire yoga program or particular poses.

Another possible specialized cloud-executed service is a fashion assistant. When a user is captured by streaming video camera 120, automatically or upon receipt of a command, a fashion service of specialized cloud-executed services 360 may analyze what the user is wearing and, via home automation controller and response engine 324, have HA device 110 indicate whether the user's clothing appears to match and suggestions on improving his look. The fashion service may keep track of items the user has previously worn for future suggestions. For instance, the fashion service, via home automation controller and response engine 324, may cause HA device 110 to output a spoken phrase such as: "Why not try switching your black shoes for the tan pair you wore on Tuesday? That would look sharp."

Still another possible specialized cloud-executed service could be individualized reminders. An individualized reminder service of specialized cloud-executed services 360 may allow a user to state to HA device 110 a request for a message or reminder and another specific user for whom the message or reminder is intended. The message or reminder may be stored by cloud-based HA integration platform 310 until the requested user is identified in a video stream captured by streaming video camera 120. In response to determining that the recipient is present, the individualized reminder service may cause home automation controller and response engine 324 to, in turn, cause HA device 110 to output the requested message or reminder, possibly along with an indication of the user who created the message or reminder.

Another possible specialized cloud-executed service could be an item finder. An item finder may be activated in response to HA device 110 receiving a command for a particular item (e.g., keys) to be found. Home automation controller and response engine 324 may invoke the item finder service from specialized cloud-executed services 360. Video received from streaming video camera 120 may be analyzed by video analysis engine 331 for the item requested in the command. For instance, based on training images, video analysis engine 331 may be trained to recognize various items. If the requested item appears in current or previous video, home automation controller and response engine 324 may cause HA device 110 to output an indication of where the item is located or where the item was last identified.

While FIG. 3 illustrates HA device 110 as distinct from streaming video camera 120, as previously detailed, it should be understood that in other embodiments an HA service may be executed on streaming video camera 120 or some other smart or home automation device rather than having a dedicated HA device 110.

Figure 4:
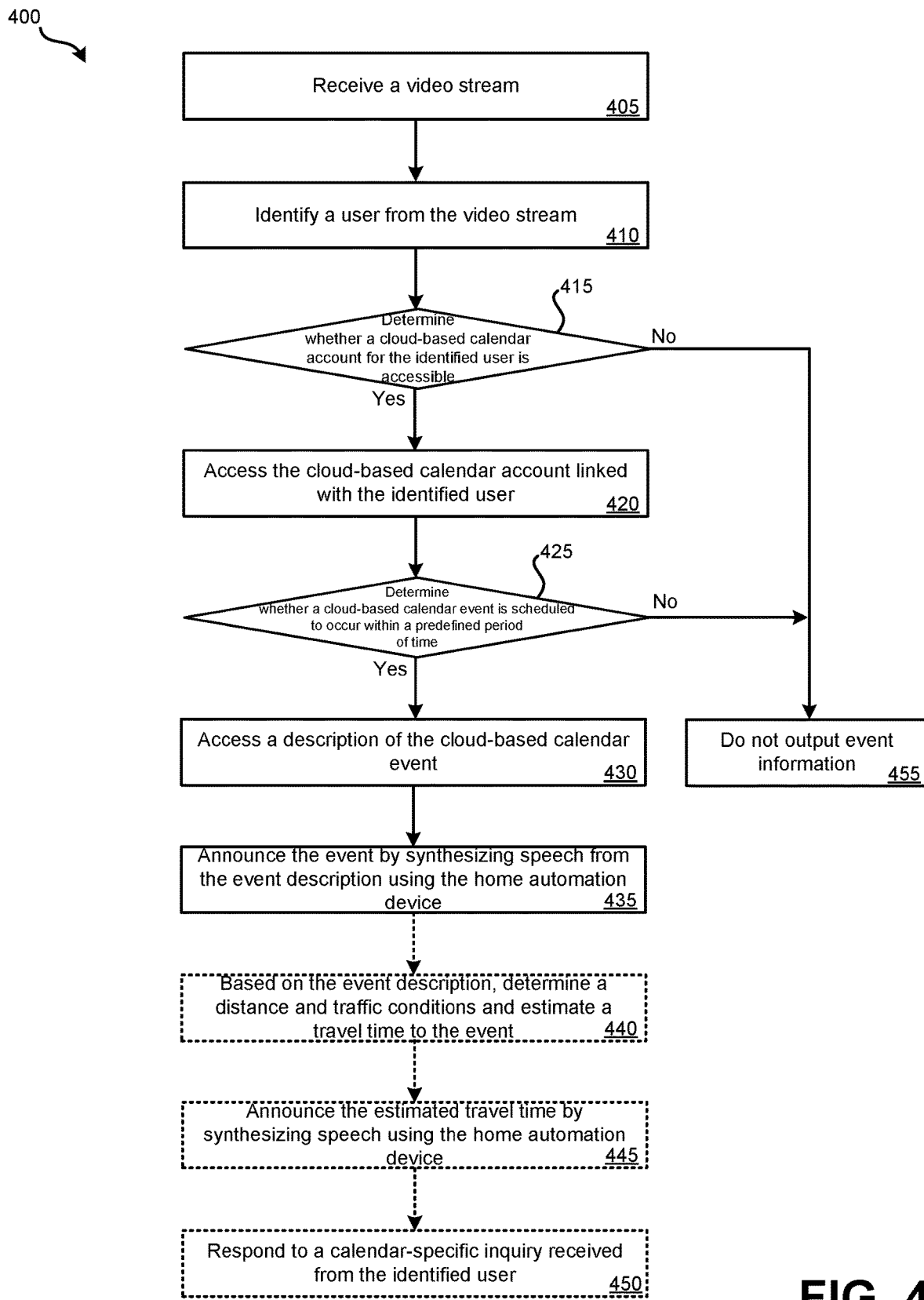
FIG. 4 illustrates an embodiment of a method for managing scheduled events using a home assistant service having an integrated video service.

Various methods may be performed using the systems, devices, and arrangements of FIGS. 1-3. FIG. 4 illustrates an embodiment of a method 400 for managing scheduled events using a HA service having an integrated video service. Method 400 may be executed using the systems and devices of FIGS. 1-3. At block 405, a video stream may be received from a streaming video camera, such as those detailed in relation to FIGS. 1-3. This video stream may be streamed via the Internet to a cloud-based HA integration platform, such as cloud-based HA integration platform 310.

At block 410, the video stream may be analyzed using a video analysis engine of the platform to identify an authorized user presented within the captured streaming video. Therefore, facial recognition features of the user may be stored in association with a user account linked with the streaming video camera and these features may be used to identify the user. At block 415, a determination may be made as to whether the identified user has a cloud-accessible calendar. Such a cloud-accessible calendar may be maintained with a same service provider that maintains the cloud-based HA integration platform or by another service provider and authorized access to the calendar has been granted to a user account linked with the identified user and the HA device and/or streaming video camera. If multiple users are present in the video stream, blocks 410 and 415 may be performed for each user. Thus, zero, one, or more than one cloud-based calendar account may be identified as accessible and linked with the one or more users present in the video stream captured by the streaming video camera.

If the determination of block 415 is yes and at least one calendar is accessible by the platform, the cloud-based calendar may be accessed at block 420. If multiple calendars are determined to be accessible at block 415, each of the calendars may be accessed at block 420. At block 425, for any of the calendars accessed, a determination may be made as to whether an event indicated within the calendar account is scheduled to occur within a predefined period of time, such as within the next one or two hours. This predefined period of time into the future may be user defined in accordance with an account linked with the HA device or service. If the result of either of blocks 415 or 425 is a no determination, method 400 may proceed to block 455 and may not cause any calendar information to be output using an HA device or HA service executed by another smart device. Therefore, if a user is unidentified, calendar information specific to any user may not be output. Rather, a generic response may be provided to the unknown person, such as announcing the time, date, sunrise time, sunset time, weather, whether the day is a holiday, etc. Alternatively, no information at all may be announced if the user is unidentified.

If the determination of block 425 is yes, at block 430 a description of the cloud-based calendar event that occurs within the upcoming predefined period of time may be accessed. At block 435, a response engine of the platform may cause a HA device or service in the vicinity of the user to announce a title, timing, and/or description of the event by causing the HA device or service to synthesize speech. In some embodiments, rather than immediately announcing a title or description of the event, the prompt may be announced by the HA device, such as outputting a query to the user asking if they are interested in the event, such as: "I notice you have a calendared event coming up in the next two hours, do you want to hear the details?" In other embodiments, the calendar event's title, time, and details may be announced without any input being provided by the user. Therefore, besides appearing in the video stream, a user may not have provided any input or request for calendar information in blocks 405-435. For instance, the HA device, based on data supplied by a response engine of the cloud-based HA platform, may announce without any additional prompting from the user, "Tom, you have a calendared event for a doctor's appointment at Lahey Clinic scheduled for 3 PM, which is 38 minutes from now." In some embodiments, for the event to be announced, the user may be required to still be present within the video stream.

In some embodiments, at block 440, the platform may access another cloud service and determine traffic conditions and estimated travel time to a location included in the calendar event. Such a block may only be performed if a specific location, such as an address or landmark, is indicated in the calendar event. At block 445, the estimated travel time to the location may be announced by the HA device or service to the user. This announcement may only be made if a specific location for the event is available in the calendar event.

At block 450, a user may pose a calendar-specific query to the HA device or service. For block 450 to be performed, blocks 425-445 may not need to be performed or block 450 can be performed after such blocks. By a user being identified using the received video stream, the user may be authorized to pose queries that are specific to a calendar that has been linked and authorized based on his identity. For instance, the user could pose a query to the HA device or service: "What is my next event?", "Do I have anything scheduled for next Tuesday?", or "What time is my doctor's appointment tomorrow?" If multiple users are present in the video stream, calendar-specific queries may only be answered via the platform when posed by the user associated with the specific calendar. Therefore, if multiple users are present, the answer to "What is my next event?" could vary by user based on their individual calendars.

Figure 5:
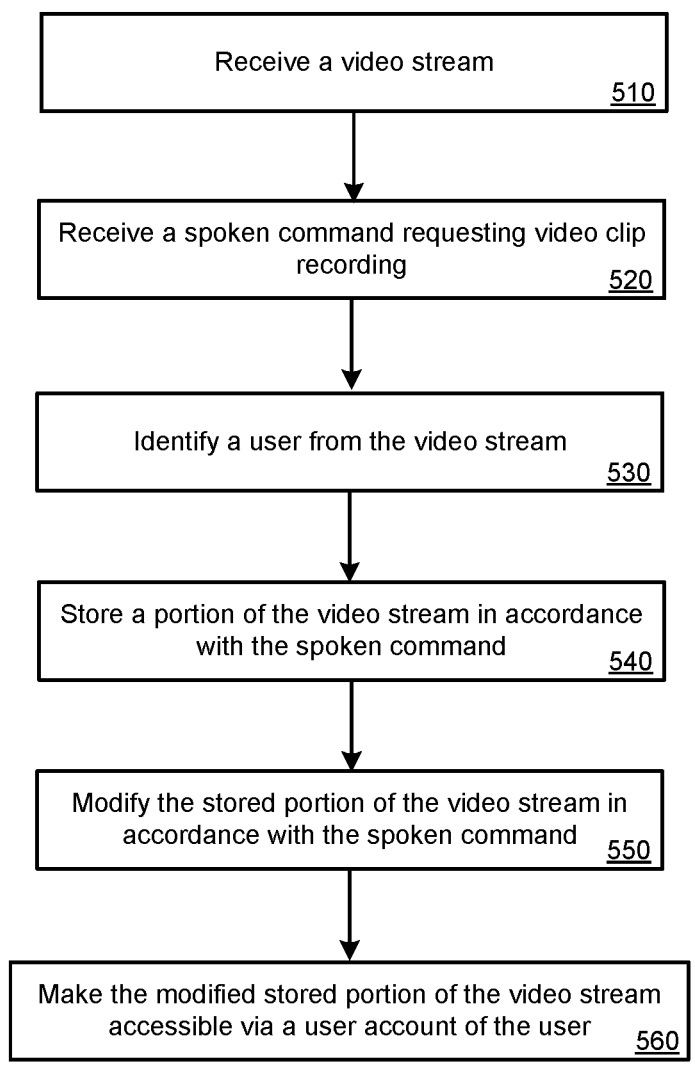
FIG. 5 illustrates an embodiment of a method for using a home assistant service to manage video or image capture.

FIG. 5 illustrates an embodiment of a method 500 for using a HA service to manage video or image capture. Method 500 may be executed using the systems and devices of FIGS. 1-3. Method 500 may be performed independently of, before, or following method 400. At block 510, a video stream may be received from a streaming video camera, such as those detailed in relation to FIGS. 1-3. This video stream may be streamed via the Internet to a cloud-based HA integration platform, such as cloud-based HA integration platform 310.

At block 520, via a HA device, a spoken command may be received from a user requesting that a video clip be recorded. This command may be received with or without a defined time period. If no time period is defined, a default time period, such as one minute, may be used. If a time period is defined, this duration may be used. The spoken command may also specify a time into the future at which the recording should be made. If no such time is specified, recording may begin immediately. If a time is specified, recording may be scheduled by a home automation controller of the cloud-based HA integration platform to be performed. At block 530, the user present in the video stream that is determined to have spoken the command may be identified. This may be performed using user account data linked with the HA device or service to which the command was spoken. If the identity of the user cannot be determined, the video may not be recorded or may still be recorded but may be linked with the master account of the HA device or service or the streaming video camera. At block 540, the portion of the video stream that corresponds to the spoken command may be stored in accordance with the spoken command. For example, even if a video storage engine stores a continuous feed to a video feed database maintained by the cloud-based HA integration platform, a separate file may be created or reference to the portion of the larger stored video feed may be made based on the spoken command. Therefore, when the user accesses his user account with the cloud-based HA integration platform, the user may have the option to access the video or portion of the video defined based on the received spoken command of block 520. As an example, a user may request that a time-lapse video be captured. Such a time lapse video may be created based on a stored video stream or may be created while the video stream is being received by periodically selecting a frame for inclusion in the time-lapse video. For example, if a one hour time lapse video is to be created, one image or frame may be from the received video stream and may be added to the time-lapse video every second.

In some embodiments, at block 550, the stored portion of the video stream may be modified. As an example of this, as part of the received spoken command of block 520, the user may specify that he desires a time lapse video or highlight reel. A time lapse video may be a compressed video from the time period defined by the spoken command such that the time lapse video is composed of many fewer frames than a video that plays back at the same speed as it was recorded. For example, one frame from every five seconds may be used to create a time lapse video that allows a video for a long duration of time to be played back in a much shorter period of time. A highlight reel may be based on video analysis performed by a video analysis engine of a cloud-based video management system that is part of or in communication with the cloud-based HA integration platform. This highlight reel may include events that have a significant amount of movement appearing in the video, as determined by a video analysis engine of the platform, or audio that exceeds a threshold in the video's associated audio.

At block 560, the modified portion of the video stream that has been created into the video requested by the user may be stored in association with the user account associated with the user. Therefore, by the user having been identified in the video stream at block 530, the video requested by the user can be linked with the correct user account. If no identity was determined at block 530, the requested video may either not be created or may be stored in association with the master account linked with the HA device or the streaming video camera. In some embodiments, after the video has been stored, a notification may be transmitted to a mobile device associated with the user indicating that the video is now available for viewing.

While method 500 is specifically directed to recording video, a user at block 520 may request the capture of a still image (i.e., picture). Again, such a command may be for the present time, or at some point in the future. Blocks 530 through 560 may be performed similarly for the still image. At block 560, the still image may be made accessible to the user via the user's user account.

Figure 6:
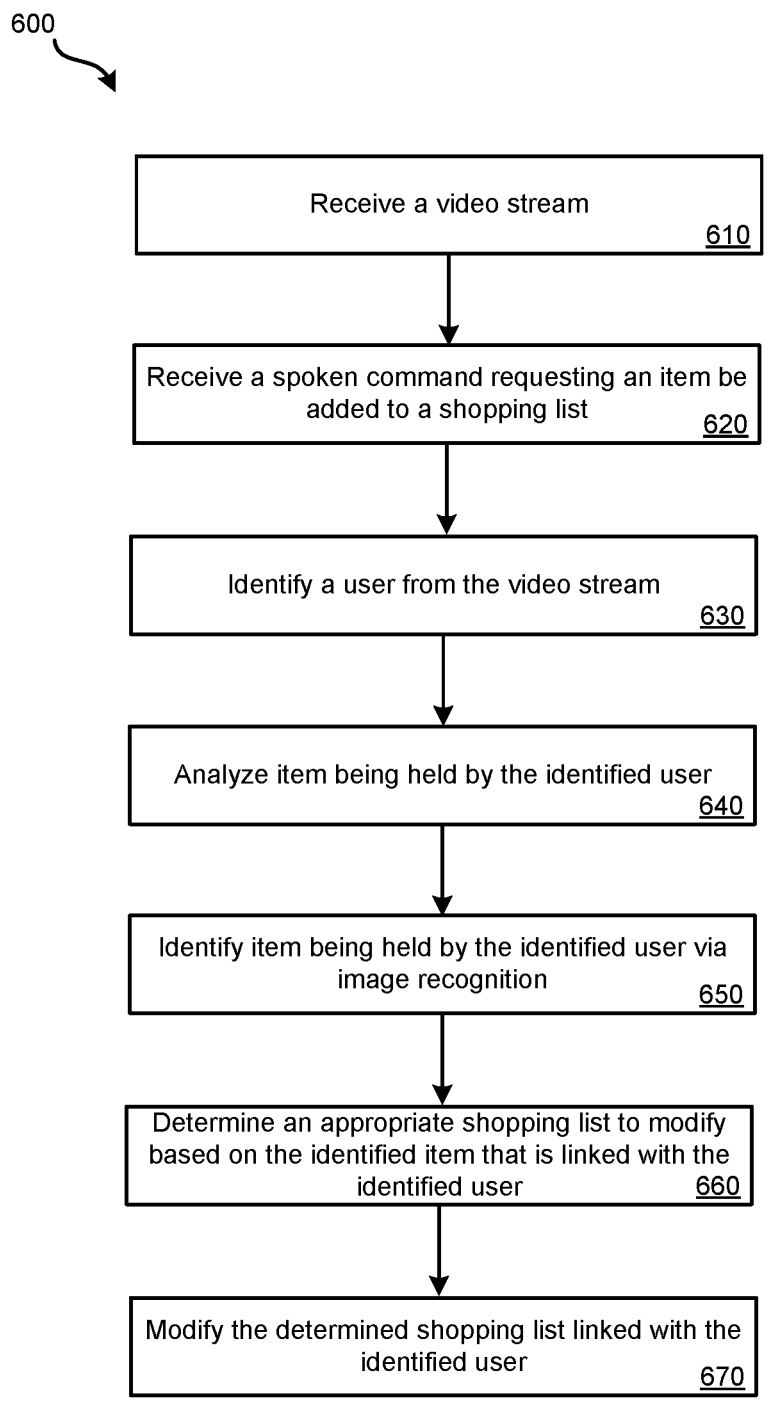
FIG. 6 illustrates an embodiment of a method for using a home assistant service that is integrated with video service to modify a shopping list.

FIG. 6 illustrates an embodiment of a method 600 for using a HA service that is integrated with video service to modify a shopping list. Method 600 may be executed using the systems and devices of FIGS. 1-3. Method 600 may be performed independently of, before, or following methods 400 and/or 500. At block 610, a video stream may be received from a streaming video camera, such as those detailed in relation to FIGS. 1-3. This video stream may be streamed via the Internet to a cloud-based HA integration platform, such as cloud-based HA integration platform 310 of FIG. 3.

At block 620, a HA device, or some other smart device executing a HA service, may receive a spoken command requesting an item be added to a shopping list. This command may require a visual reference. For example, the spoken command may say "add this item to my shopping list." Therefore, video streamed by a streaming video camera may need to be accessed in order to determine the particular item the user is referring to.

At block 630, the user may be identified within the video stream. In order for a user to add an item to a shopping list, the user may be required to be an authorized user according to user account data stored by the cloud-based HA integration platform. At block 630, the video stream may be analyzed using a video analysis engine of the platform to identify an authorized user presented within the captured streaming video. Therefore, facial recognition features of the user may be stored in association with a user account linked with the streaming video camera and these features may be used to identify the user.

At block 640, the video analysis engine of the platform may attempt to identify an item being held or pointed to by the user. For example, if the user is holding a box, text and/or graphics appearing on the box may be analyzed, such as to determine that the user is holding a box of "Frosted Rice" cereal. At block 650, the item may be identified based on the image analysis of block 640. Such image analysis may be able to identify various common items that would typically be ordered or purchased by user, such as food items, cleaning supplies, toiletries, etc.

At block 660, an appropriate shopping list to modify may be determined based on the identified user and the identified item. Regarding the identified user, only shopping lists that are linked with a user account of the user may be permitted to be updated based on the spoken command received at block 620 from the user. Further, at block 660, regarding the identified item, depending on the type of item, the particular shopping list that is modified may be selected. For example, food items may be added to a grocery store shopping list, while toiletries may be added to an online pantry shopping list.

At block 670, the determined shopping list may be modified based on the determination of block 660 to include the identified item. When the user accesses the shopping list via the cloud-based HA integration platform at some point in the future, the item that was requested to be added to the shopping list based on the spoken command of block 620 may now be listed. In other embodiments, rather than having the item added to a shopping list, the spoken command may directly request that the item be purchased. Blocks 630 through 670 may be similarly performed except that rather than the item being added to a determined shopping list, the item may be purchased through determined vendor.

Figure 7:
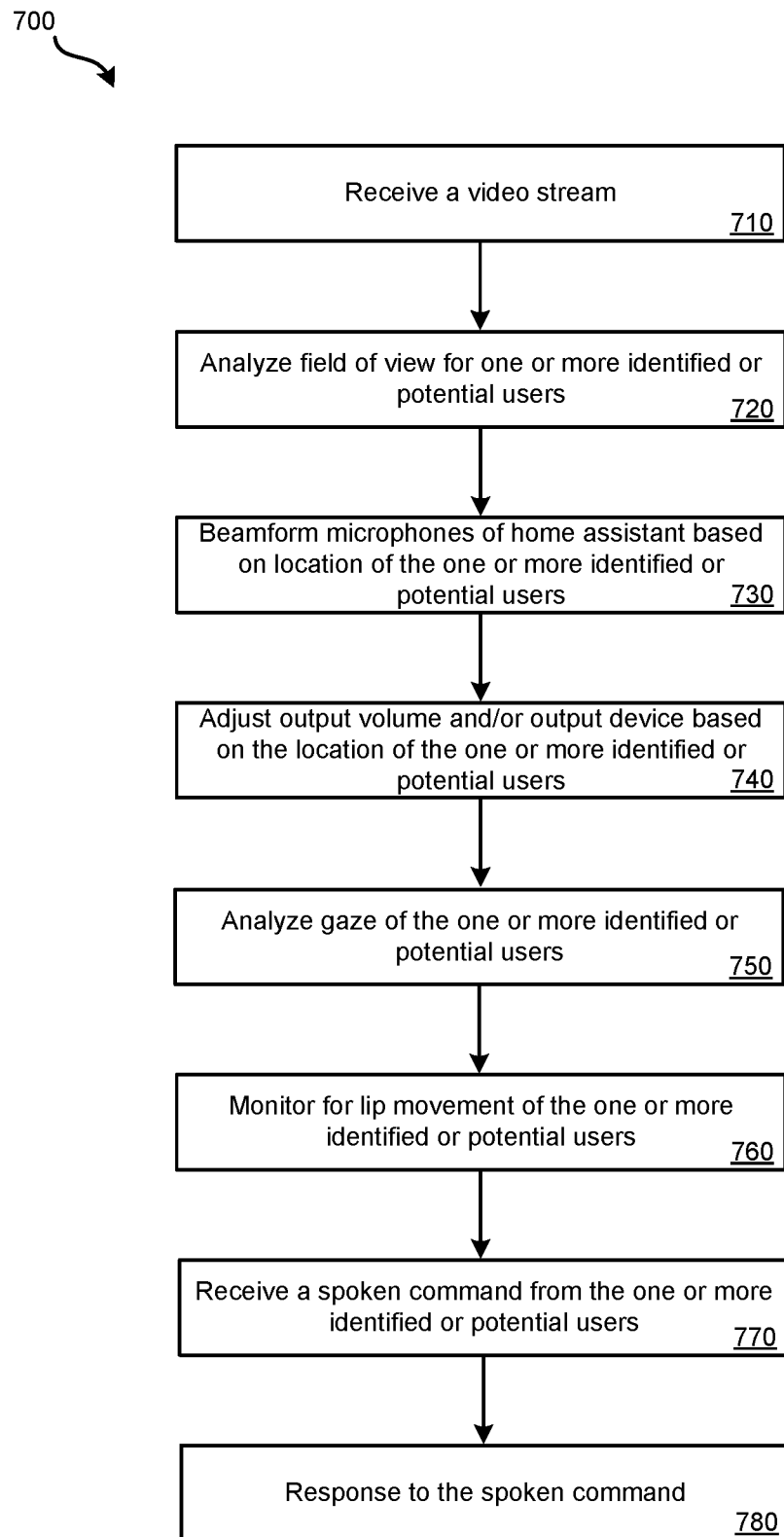
FIG. 7 illustrates an embodiment of a method for handling spoken commands based on characteristics observed by an integrated video service.

FIG. 7 illustrates an embodiment of a method 700 for handling spoken commands based on characteristics observed by an integrated video service. Method 700 may be executed using the systems and devices of FIGS. 1-3. Method 700 may be performed independently of, before, or following methods 400, 500, and/or 600. At block 710, a video stream may be received from a streaming video camera, such as those detailed in relation to FIGS. 1-3. This video stream may be streamed via the Internet to a cloud-based HA integration platform, such as cloud-based HA integration platform 310 of FIG. 3.

At block 720, the received video stream may be analyzed for one or more users. Such users may be any person appearing within the video stream (whether authorized or not). At block 730, a home automation controller of the cloud-based HA integration platform may provide instructions to the HA device or smart device providing HA services to beam form the device's plurality of microphones (by analyzing the phase of received audio) to be more sensitive to audio received from the vicinity of the one or more potential users and decreased sensitivity to audio received from areas away from the one or more potential users. Therefore, by analyzing the location of potential users obtained from a streaming video camera, the HA device can be more sensitive to future spoken commands from the user while ignoring audio from other sources, such as televisions and appliances. Blocks 710 through 730 may be repeated in order to account for movement of the users within the field of view of the video stream. Therefore, as a user moves around, the microphones of the HA device or the device providing HA services may have their input filtered according to phase in order to beam form and remain more sensitive to audio in the vicinity of the user to the exclusion of other areas.

At block 740, which may be performed independently of block 730, the output volume and/or output device through which audio is output may be adjusted based on the locations of the one or more users identified in the analyzed video stream of block 720. The video may be analyzed to determine a location of the HA device (or a user may indicate via a user interface where the HA device or smart device provides the HA service). Based upon a distance present between the HA device outputting audio and the one or more users as determined by a video analysis engine of the cloud-based HA integration platform, the output volume of the HA device may be adjusted by the home automation controller being executed by the cloud-based HA integration platform. If multiple audio output devices are available under the control of the home automation controller of the cloud-based HA integration platform, the home automation controller may shift audio output to a device closer to the user than the device currently outputting the audio. Therefore, by monitoring the location of one or more users via the video stream, output audio may follow the user as it moves at a location. One possible use case for such an arrangement is having music follow the user from room to room within his house.

At block 750, the gaze of one or more users may be analyzed. Block 750 may be performed independently of blocks 730 and/or 740, or may be performed following one or both of these blocks. The gaze may be analyzed by a video analysis engine executed by a cloud-based video management system of the cloud-based HA integration platform. The gaze of the user may be analyzed to determine where the user is looking. Particularly, at block 750, it may be determined whether the user is looking at an HA device (or a smart device providing HA services), at the streaming video camera, or elsewhere. Again here, the location of the HA device may be known based on the HA device being identified within the video stream or user having provided information to the cloud-based HA integration platform that indicates the location of the HA device in relation to the streaming video camera.

At block 760, which may be performed independently of block 730 through 750, movement may be monitored for on users appearing in the video stream.

At block 770, a spoken command may be received by the HA device or smart device providing the HA services from a user. To determine who the user was that spoke the commands if multiple users are present, the determination of block 760 and/or the analyzed gaze(s) of block 750 may be used. If a user is looking at the streaming video camera or the HA device, an assumption may be made that that particular user spoke the command. If a user's lips are moving when the command was received by the HA device, an assumption may be made by the cloud-based HA integration platform that that particular user spoke the command. In the instance of a conflict, such as one user looking at the HA device while another user's lips are moving, preference may be given to the user whose lips are moving.

In some embodiments, by the user simultaneously looking directly at the HA device while the command is spoken, the device providing HA services, or the streaming video camera, the user can avoid having to speak a hot word or hot phrase in order to activate the HA device to receive a command or query. As such, eye contact can be used as a substitute for a hot word or hot phrase.

At block 780, the spoken command may be responded to by the home automation controller of the cloud-based HA integration platform. The command may be responded to or executed based on the authorizations or permissions of the user who spoke the command. For instance, a command that requests calendar information may thus trigger information from that user's cloud-based calendar to be retrieved.

Figure 8:
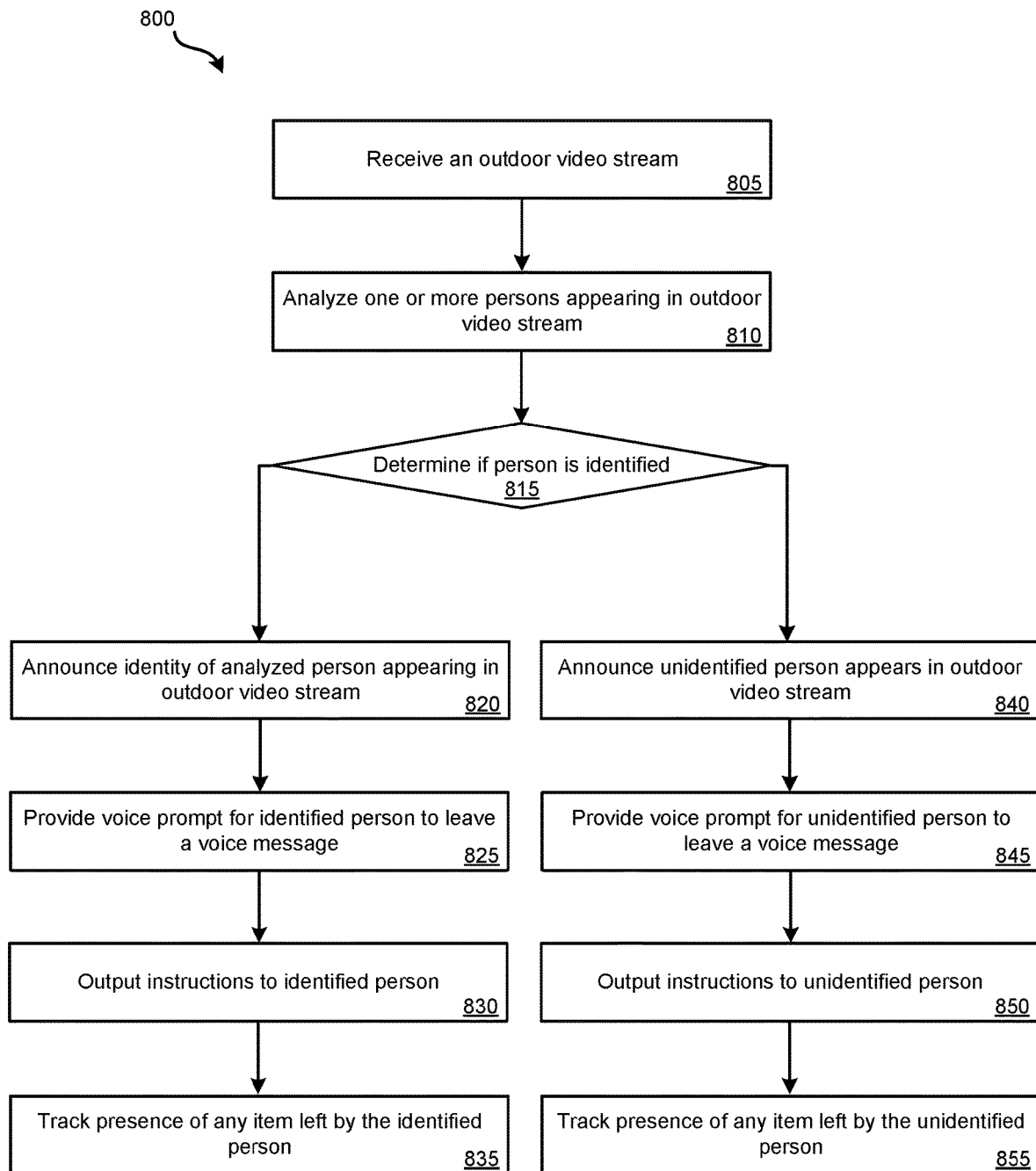
FIG. 8 illustrates an embodiment of a method for interacting with a person announcing his or her presence using a home assistant service integrated with a video service.

FIG. 8 illustrates an embodiment of a method 800 for interacting with a person announcing their presence using a HA service integrated with a video service. Method 700 may be executed using the systems and devices of FIGS. 1-3.

Method 800 may be performed independently of, before, or following methods 400, 500, 600, and/or 700. At block 805, a video stream may be received from an outdoor streaming video camera, such as those detailed in relation to FIGS. 1-3. This video stream may be streamed via the Internet to a cloud-based HA integration platform, such as cloud-based HA integration platform 310 of FIG. 3.

At block 810, a person may be identified within the video stream. Facial recognition of features of the person may be analyzed to determine if the person matches an authorized user based on user data stored by the cloud-based HA integration platform in association with a user account linked with the outdoor streaming video camera or a data store that stores known persons (who may not be authorized). For example, a profile for a neighbor may be stored that includes a name and facial features of the neighbor, but does not provide any authorizations with the HA device, smart device providing HA services, or the streaming video camera. At block 815, the platform may determine if the person is identified as an authorized user or not. If yes, method 800 may proceed to block 820. If not, method 800 may proceed to block 840.

At block 820, the identity of the person that has been identified may be announced by an HA device or smart device providing HA services within the structure. For instance, upon the person ringing a doorbell or simply being present on the video stream, the HA device may announce the person's name and indicate that the person is outside. If the HA device determines that no one is within the home or that no one has answered the door, a voice prompt may be provided to allow the person at the door to leave a voice message at block 825. This message, along with an indication of the person's determined identity, may be sent to a mobile device of one or more authorized users of the HA device and/or outdoor streaming video camera. This may be performed via a smart doorbell or some other outdoor device, such as the outdoor streaming video camera, that provides HA services. At block 830, instructions may be output by the smart device providing HA services to the identified person. The instructions may be based on the identity of the identified person. For instance, if the identified person works for a delivery company, the output instructions of block 830, which may be provided in a spoken format, may indicate where a package for delivery should be left.

At block 835, any item left by the identified person may be tracked using the video from the outdoor streaming video camera. Therefore, if the identified person left a package, the location of the package and any activity that occurs near the package may be tracked. This may, for example, make it easy to identify a thief if the package is stolen.

At block 840, the person that could not be identified may be announced by an HA device or smart device providing HA services within the structure. For instance, upon the person ringing a doorbell or simply being present on the video stream, the HA device may announce an unknown person has been detected on the outdoor video camera's stream outside. If the HA device determines that no one is within the home or that no one has answered the door, a voice prompt may be provided to allow the unknown person at the door to leave a voice message at block 845. This may be performed via a smart doorbell or some other outdoor device, such as the outdoor streaming video camera, that provides HA services. At block 850, instructions may be output by the smart device providing HA services to the identified person. Since the person is unidentified, the instructions may be general instructions suitable for all visitors, such as package delivery instructions or instructions to try a back door.

At block 855, similar to block 835, any item left by the identified person may be tracked using the video from the outdoor streaming video camera. Therefore, if the identified person left a package, the location of the package and any activity that occurs near the package may be tracked. This may, for example, make it easy to identify a thief if the package is stolen.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for modifying a shopping list using a home assistant device and an integrated video service, the method comprising:
    capturing, using a network-enabled video camera, a video stream of a location at which a user is present;
    receiving, by a home assistant device, a spoken command that requests an item be added to a shopping list;

analyzing the video stream captured using the network-enabled video camera to determine an identity of the user;
determining the shopping list to modify based on the identity of the user; and
modifying the determined shopping list to indicate the item requested in the spoken command.

2. The method for modifying the shopping list using the home assistant device and the integrated video service of claim 1, wherein the spoken command requires a visual reference to determine the item to be added to the shopping list.

3. The method for modifying the shopping list using the home assistant device and the integrated video service of claim 2, the method further comprising:
in response to the spoken command requiring the visual reference to determine the item to be added to the shopping list, analyzing the video stream to determine an item being referenced by the user; and
identifying the item based on analyzing the video stream.

4. The method for modifying the shopping list using the home assistant device and the integrated video service of claim 2, wherein the item being referenced by the user is being held by the user or being pointed to by the user.

5. The method for modifying the shopping list using the home assistant device and the integrated video service of claim 1, wherein determining the shopping list to modify is further based on the item to be added to the shopping list.

6. The method for modifying the shopping list using the home assistant device and the integrated video service of claim 1, further comprising:
streaming, by the network-enabled video camera, the video stream to a cloud-based home assistant integration platform.

7. The method for modifying the shopping list using the home assistant device and the integrated video service of claim 6, further comprising:
storing, by the cloud-based home assistant integration platform, the video stream for at least a period of time.

8. The method for modifying the shopping list using the home assistant device and the integrated video service of claim 7, wherein analyzing the video stream captured using the network-enabled video camera to determine the identity of the user is performed by the cloud-based home assistant integration platform.

9. The method for modifying the shopping list using the home assistant device and the integrated video service of claim 8, further comprising:
transmitting, by the home assistant device, the spoken command that requests the item be added to the shopping list to the cloud-based home assistant integration platform; and
analyzing, by the cloud-based home assistant integration platform, the spoken command using a speech recognition engine and a natural language interpretation engine.

10. A system for managing a shopping list, the system comprising:
a network-enabled video camera that captures a video stream of a location and streams the video stream to a cloud-based home assistant integration platform;
a home assistant device comprising a microphone and wireless network interface, the home assistant device configured to:
receive, via the microphone, a spoken command that requests an item be added to a shopping list; and
the cloud-based home assistant integration platform, configured to:
analyze the video stream captured using the network-enabled video camera to determine an identity of a user;
determine the shopping list to modify based on the identity of the user; and
modify the determined shopping list to indicate the item requested in the spoken command.

11. The system for managing the shopping list of claim 10, wherein the spoken command requires a visual reference to determine the item to be added to the shopping list.

12. The system for managing the shopping list of claim 11, wherein cloud-based home assistant integration platform is further configured to:
analyze the video stream to determine an item being referenced by the user in response to the spoken command requiring the visual reference to determine the item to be added to the shopping list; and
identify the item based on analyzing the video stream.

13. The system for managing the shopping list of claim 11, wherein the item being referenced by the user is being held by the user or being pointed to by the user.

14. The system for managing the shopping list of claim 10, wherein the cloud-based home assistant integration platform being configured to determine the shopping list to modify is further based on the item to be added to the shopping list.

15. The system for managing the shopping list of claim 10, wherein the network-enabled video camera is further configured to stream the video stream to the cloud-based home assistant integration platform via the wireless network interface.

16. The system for managing the shopping list of claim 15, wherein the cloud-based home assistant integration platform is further configured to store the video stream for at least a period of time.

17. The system for managing the shopping list of claim 10, wherein:
the home assistant device is further configured to transmit the spoken command that requests the item be added to the shopping list to the cloud-based home assistant integration platform via the wireless network interface; and
the cloud-based home assistant integration platform is further configured to analyze the spoken command using a speech recognition engine and a natural language interpretation engine.

18. A non-transitory processor-readable medium comprising processor-readable instructions configured to cause one or more processors to:
receive a video stream of a location at which a user is present;
receive a spoken command that requests an item be added to a shopping list;
analyze the video stream captured using a network-enabled video camera to determine an identity of the user;
determine the shopping list to modify based on the identity of the user; and
modify the determined shopping list to indicate the item requested in the spoken command.

19. The non-transitory processor-readable medium of claim 18, wherein the processor-readable instructions, when executed, further cause the one or more processors to:

analyze the video stream to determine an item being referenced by the user in response to the spoken command; and identify the item based on analyzing the video stream.

* * * * *